TESTING THE PERFORMANCE OF PCM RECEIVERS

Filed Dec. 23, 1959 3 Sheets-Sheet 1

INVENTOR
H. MANN
BY R. B. Ardis
ATTORNEY

Oct. 9, 1962 H. MANN 3,057,972

TESTING THE PERFORMANCE OF PCM RECEIVERS

Filed Dec. 23, 1959 3 Sheets-Sheet 2

INVENTOR
H. MANN
BY R. B. Ardis
ATTORNEY

H. MANN
BY R. B. Ardis
ATTORNEY

United States Patent Office 3,057,972

Patented Oct. 9, 1962

3,057,972

TESTING THE PERFORMANCE OF PCM RECEIVERS

Henry Mann, Berkeley Heights, N.J., assignor to Bell Telephone Laboratories, Incorporated, New York, N.Y., a corporation of New York Filed Dec. 23, 1959, Ser. No. 861,533
13 Claims. (Cl. 179—175)

This invention relates generally to systems that employ pulse code modulation (PCM) principles. It specifically concerns devices for testing the performance of PCM receivers.

In the past, it has been necessary to test such a receiver by using its associated transmitter as a test-signal source. In "companded" PCM systems, for example, this was accomplished by encoding a compressed analog signal at the transmitter, then supplying the encoded signal to the decoder. This process has several notable disadvantages. Three of them will illustrate the need of a better process.

First, the receiver cannot be tested if its associated transmitter is either disabled or is in active use, conveying information to other receivers. Second, discrepancies in the reproduction of the original analog signal at the receiver can be attributed to a faulty transmitter or transmission link just as easily as to a defective receiver. The process is thus plagued by uncertainty as to the source of error. And third, periodically recurrent samples of the analog test signal will not yield identical values, thus rendering the testing process dependent upon a variable which we would like to do without.

In the absence of an illustrative example, the third-mentioned disadvantage is perhaps obscure. Suppose that the analog test signal is a sine wave, and that samples are taken at every quarter-cycle of the wave, i.e., at zero degrees, 90 degrees, 180 degrees, 270 degrees and so on. If the analog signal generator is absolutely drift-free, every fifth sample will be of identical value. But absolutely drift-free generators are not encountered in practice; nor are drift-free timing wave generators, which determine the sample rate. Consequently, the sine wave will not be "locked" with the sampling rate (i.e., with the timing wave), and every fifth sample of the sine wave will not yield the same value.

In sum: in the exceptional situation where the transmitter is not in active use, where it is known that the transmitter and connecting medium are error-free or produce errors discernible and separable from the finally-rendered signal, and where the analog test signal is reasonably "locked" with the timing wave (sampling rate), such a performance test may be wholly satisfactory. However, in the usual case, uncertainty as to the source of error in the reproduced signal at the receiver, is sufficient of itself to make the test a tenuous and unsatisfactory one.

It is an object of the present invention to test the performance of PCM receivers without the need of an associated transmitter. Another, related, object is to accomplish such a test with greater simplicity and effectiveness than is possible in processes that must resort to the use of an analog signal generator as a test-signal source.

In accordance with the invention, a digital sine-wave generator is used in lieu of a PCM transmitter to supply the code representation of hypothetical samples of a sine wave to the decoder of a PCM receiver. These samples are labeled "hypothetical" because the analog version of the sine wave is not used in the process. In one embodiment, the generator comprises a plurality of code-group storing devices each of which is triggered at appropriate times by a ring counter. Each code group represents a specified sample of the sine wave. The code groups are supplied to the receiver, which responds to them in the same fashion that it would had they been generated by its associated PCM transmitter.

Quantizing distortion is a price which ordinarily must be paid for the advantages of communication by PCM. Consequently, where the hypothetical sampling rate of the invention is greater than four times the frequency of the digital sine wave, as it is in the first embodiment (FIG. 1) to be discussed, each of the code groups ordinarily will represent, not the actual sample value, but the quantum level nearest to that value. Nevertheless, if the test code is subject to quantizing impairment, it is not to a random unpredictable sort, but rather to that which is theoretically expected. And since the theoretical quantizing distortion is known, the test signal may be used every bit as effectively as it could be if each code group had no quantizing impairment whatever. Therefore, when the code groups are supplied to the receiver, the digital-to-analog conversion process should result in a sine wave having only the theoretically expected impairment. Deviations from this expectancy reveal defects in the performance of the receiver.

Where the sample rate is four times the frequency of the assumed sine wave, so that a sample is supposedly taken at every quarter-cycle of the wave, the wave is defined by minimum, maximum, and zero code values only. Consequently, there is no quantizing impairment. Thus, in the embodiment of FIG. 3, any defects in the output sine wave of the receiver can be exclusively attributed to noise or distortion accumulated in the receiver.

The present invention is advantageously used to determine the contributions of PCM receivers to spurious noise and distortion, and to locate the sources of these errors. It should prove equally advantageous in the production testing of these receivers. Moreover, a digital sine-wave generator, arranged in accordance with the invention, may be employed as a control-signal source for purposes of gain control of companding devices in PCM terminals. As such a source, the generator would become an integral part of the terminal. The above-mentioned uses, to which the invention may be put, have been set forth not to delimit, but rather to illustrate its utility in the communications art.

A better understanding of the invention may be had from a consideration of some of its embodiments. These embodiments will be discussed in connection with the drawing, in which.

Figures 1, 1A:
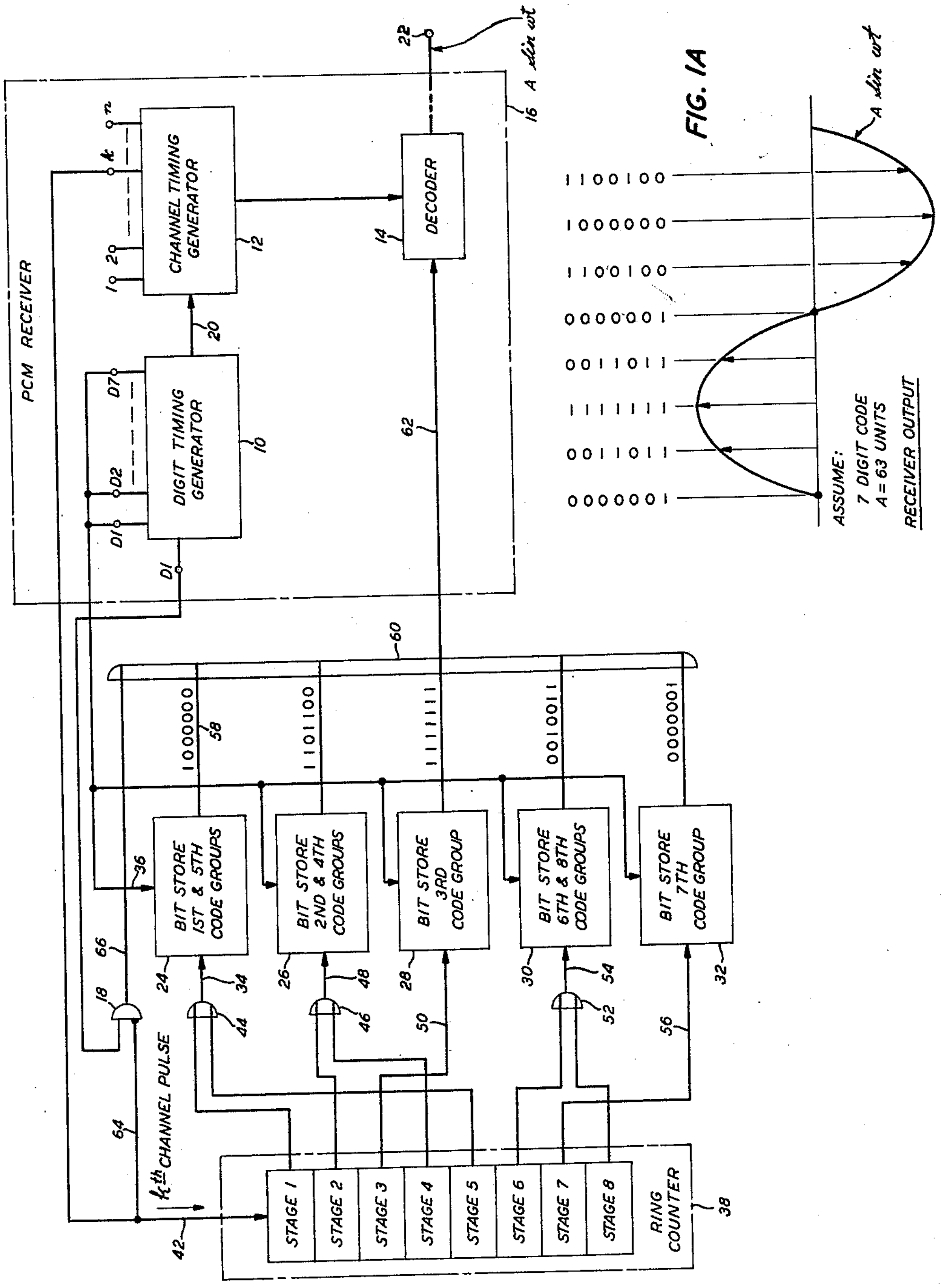
FIG. 1 shows, as one of the forms that the invention may take, a digital wave generator connected to test a PCM receiver.
FIG. 1A is a waveform depicting the output of the receiver of FIG. 1.

FIG. 1 shows a PCM receiver 16 to which is connected a digital wave generator arranged in accordance with the invention. In addition to the decoder 14, only those parts of the receiver which control the timing of the generator are shown. FIG. 1 shows as receiver components only the digit timing generator 10, the channel timing generator 12 and the decoder 14. Thus, for example, the amplifiers, channel gates, and filters that orinarily would lie between the decoder 14 and the receiver output 22 have been disregarded for the sake of simplicity.

It will be assumed in the description which follows that the PCM receiver 16 works in a system that transmits information over twenty-four channels during the interval of one frame. The frames, and hence the channels, are periodically recurrent. It will also be assumed that each channel consists of seven time slots to accommodate a seven-digit code group and that no guard spaces are provided between the time slots. Fnally, for ease of narration, it will be assumed that the PCM system is linear, i.e., that companding is not employed. These assumptions are made only to enhance a clear understanding of the invention. It is not necessary, for example, that there be twenty-four channels per frame, or seven time slots per channel, or that the system be linear.

The channel timing generator 12 has terminals 1, 2 . . . *k* . . . *n*, each of which serves to time a particular channel. Since only one of these channel terminals need be used to supply timing information to the test circuit, the channel terminal *k* has been selected to serve this purpose. The digit timing generator 10 has terminals which provide timing information to control the commencement and duration of the various time slots. Of these terminals, D1, D2 and D7 are shown by way of illustration. The terminal D1 has been duplicated since, as will be seen, it is necessary to isolate the D1 pulse from the others so that the enablement of inhibit gate 18 will be accomplished by D1 pulses only. The channel timing generator 12 operates under the control of the digit timing generator 10 as shown by the connecting lead 20.

The test circuit comprises five bit-storing devices, each of which stores a group of code elements representative of the code value of a particular sample of a specified wave. The wave most advantageously employed in the testing process is a since wave, although other waveforms may be used. The sine wave $A \sin \omega t$, shown in FIG. 1A, is the output wave-form which is ideally produced at the output 22 of the receiver 16 in response to code groups supplied to the decoder 14 by the bit-storing devices. As mentioned above, these devices store code groups which represent recurrent samples of the sine wave. These samples are shown in FIG. 1A. But it should be noted that, in accordance with the invention, the code groups are not derived in an analog-to-digital conversion process from a sine wave. Such a process, with the inherent disadvantages mentioned at the beginning of this specification, would be necessary if an analog sine generator were employed. (See, e.g., A. M. Levine Patent No. 2,795,650, issued January 11, 1957.) Rather, the code groups are stored as such in the bit-storing devices of FIG. 1.

As can be seen in FIG. 1A, eight code groups are used to define each cycle of the wave. Since some of these are repetitive (viz., the first and fifth, the second and fourth, and the sixth and eighth), it is not necessary that eight bit-storing devices be employed. Thus, the bit store 24 stores the first and fifth code groups (10000000), the bit store 26, the second and fourth code groups (1101100), the bit store 28, the third code group (1111111), the bit store 30, the sixth and eighth code groups (0010011), and the bit store 32, the seventh code group (0000001). Each of these bit stores has a trigger input and a timing input. For example, the trigger input of bit store 24 is indicated by the input lead 34. Its timing input is shown as the input lead 36. Each of the trigger inputs of the bit stores is connected to one or more of the stages of ring counter 38. Each of the timing inputs of the bit stores is connected to the timing terminals D1 through D7 of the digit timing generator 10.

The ring counter 38 has eight stages, the total number of which corresponds to the number of samples hypothetically taken during each cycle of the sine wave of FIG. 1A. The trigger input 42 of the ring counter 38 is shown connected to the *k*th channel terminal of the channel timing generator 12 and to the first stage of the counter. As is typical of ring counters, each of the stages is triggered sequentially and in proper order. Thus, stage 1 will be triggered into a binary "1" state upon the application of the first of the *k*th channel pulses. As through it were a stepping switch, the counter moves this binary "1" state one stage around the "ring" with the application of each *k*th channel pulse. The sequence is stage 1 through stage 8, stage 8 to stage 1, and so on. For a more thorough discussion of ring counters, see Millman & Taub, Pulse and Digital Circuits, pages 343–44 (McGraw-Hill, 1956).

Since the bit stores 24, 26 and 30 will each be triggered twice during a cycle of the sine wave of FIG. 1A, each of them is connected to two of the stages of the ring counter 38. The trigger input 34 of bit store 24 is connected to stages 1 and 5 by the OR gate 44. The OR gate 46 interconnects the stages 2 and 4 with the trigger input 48 of bit store 26. The trigger input 50 of bit store 28 is connected directly to stage 3. OR gate 52 interconnects the stages 6 and 8 with the trigger input 54 of bit store 30. Finally, the trigger input 56 of bit store 32 is connected directly to stage 7. Thus, each *k*th channel pulse causes one of the stages of the ring counter 38 to supply one of the bit-storing devices with a triggering stimulus that commences the discharge of the pulse code group stored within the device.

The digits themselves are timed by the digit timing generator 10 so that they emerge from their respective bit stores in an ordered array. Each of the outputs of the bit stores (for example, the output 58 of bit store 24) is connected to the output OR gate 60 of the test circuit. The output 62 of OR gate 60, in turn conveys the pulse code to the decoder 14.

It is well to notice that the code employed in the system of FIG. 1 is one in which the zero level is represented by the mid-range of the code. The code is merely illustrative. Other codes can be stored in the storing devices. The code selected for testing will, in any event, depend upon the code employed by the PCM system.

The illustrative code consists of seven digits. The code can thus represent 127 discrete levels. Since the zero level is the mid-level of the code, it is represented by the code group 1000000. This code group would ordinarily have a value of 64, since the most significant digit is a "1" which calls for a value of 2. But because this code group now represents the mid-level, it is representative of a code value of zero. All positive values of the code will lie above mid-level and will thus have a first digit of "1." All negative values of the code will lie below and have a first digit of "0." The code group 1111111 is used to represent the maximum value of the sine wave. Now, if the code group 0000000 were used to represent the minimum value, the sine wave would be distorted, since its minimum value would be 64 levels beneath the zero level and its maximum value only 63 levels above. Consequently, its minimum value is represented by the code group 0000001. Using this code group to represent the minimum value of the since wave, a symmetrical sine wave will be obtained, since the maximum and minumum values are both 63 levels removed from the zero level.

One other consideration should be mentioned at this point. Since a code group of 0000000 will be interpreted by the decoder 14 as having a code value of $-64$ units, it is necessary that during all channels other than the *k*th channel, successive code groups of 1000000 be supplied to the decoder to maintain the decoder at zero level. This provision may not be necessary for PCM receivers that are equipped so that they do not respond to a 0000000 input, or employ codes such that an input of either 1000000 or 0000000 signifies zero.

At any rate, in the circuit of FIG. 1, the inhibit gate 18 ensures that the input PCM level at the decoder 14 will be zero at all times other than the occurrences of the $k$th channel. The inhibit input 64 of the inhibit gate 18 is connected to the $k$th channel terminal of the channel timing generator 12. The other, "noninhibit" or "normal," terminal is connected to one of the D1 terminals of the digit timing generator 10. It may be assumed that the D1 terminals are isolated within the digit timing generator 10. Isolation is necessary to ensure inhibition of gate 18 by D1 pulses only.

The output 66 of inhibit gate 18 becomes an input of the output OR gate 60. Thus, whenever the channel timing generator 12 produces a channel pulse at its $k$th terminal, the inhibit gate 18 will be inhibited so that the digit pulse from the terminal D1 of digit timing generator 10 will not be passed through the inhibit gate 18. On the other hand, at all times other than the intervals occupied by the $k$th channel, the inhibit gate 18 will convey successive code groups of 1000000, via the output OR gate 60, to the decoder 14.

Figure 2:
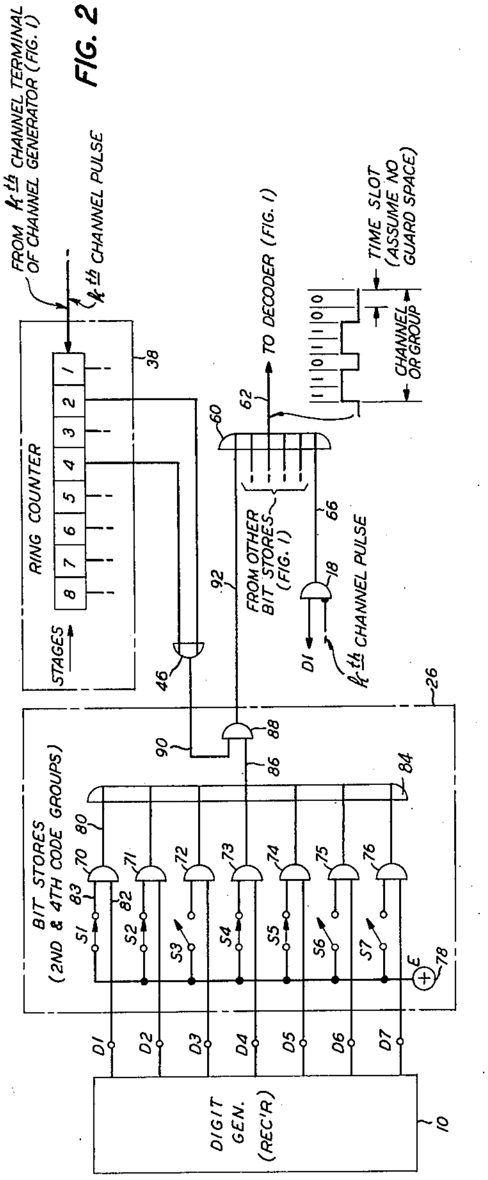
FIG. 2 shows a bit-storing device, employable in the circuit of FIG. 1, whose code content may be varied as desired.

The circuit of FIG. 2 shows a type of variable store that may be employed in the circuit of FIG. 1. A variable store is one in which each of the stored code elements may be rearranged as desired. In FIG. 2, only one of the bit stores of FIG. 1 has been shown in detail: namely, the bit store 26. The ring counter 38, the output OR gate 60, and the digit timing generator 10, all of which are shown in FIG. 1, are connected in like fashion in FIG. 2 to the bit store 26. The OR gate 46 and the inhibit gate 18 have also been repeated in FIG. 2. The bit store 26 comprises a plurality of code-element-producing AND gates that correspond in number to the number of elements per group of the code. Thus, there are seven gates, namely, AND gates 70 through 76. Each of these AND gates has a timing input, a reference input and an element-discharging output. The timing inputs of the AND gates 70 through 76 are each connected to an associated one of the terminals D1 through D7 of the digit timing generator 10. The reference inputs are each connected through a switch to a source of reference potential 78. The AND gates 70 through 76 are connected to the reference source 78 by way of the switches S1 through S7, respectively. These switches may be operated by any of a number of well-known schemes. They may, for example, simply be manually set; or they may be operated by a punched-card control system. At any rate, the code may be generated by opening or closing the switches in accordance with the digit combination desired. Since the bit store 26 of the illustrative embodiment of FIG. 1 calls for storage of the code group 1101100, the switches S1, S2, S4 and S5 are closed, while the switches S3, S6 and S7 are open.

As was mentioned previously, the digit timing generator 10 controls the digit positions of the code so that pulses will appear periodically at each of the terminals D1 through D7. Each of the code-element-producing AND gates 70 through 76 will thus produce a binary "1" output only upon the concurrence of a timing pulse from one of the terminals D1 through D7 and reference potential from the source 78. The output 80 of AND gate 70, for example, will be in the binary "1" state each time a D1 timing pulse is supplied to timing input 82, since the D1 timing pulse concurs with the reference potential, supplied by way of the switch S1 to the reference input 83, to enable AND gate 70. The binary "1" pulse at the output 80 of AND gate 70 is then conveyed to the OR gate 84 and thence to the input 86 of AND gate 88. The other input 90 of AND gate 88 is connected to the output of OR gate 46. Since, as we have seen before, the ring counter 38 is activated stage-by-stage by the $k$th channel pulses of the channel timing generator 12 of FIG. 1, the OR gate 46 will be enabled during the second and fourth frames of every eight-frame sequence. When the AND gate 88 is thus enabled by the OR gate 46 and the OR gate 84, a binary "1" pulse will be supplied to the output OR gate 60 and thence to the decoder 14 of FIG. 1.

The waveform, shown to be present at the output 62 of the output OR gate 60, represents the code group 1101100. The digits are shown, by way of illustration, as each occupying an entire time slot. In practice, however, guard spaces are often interspersed between the digits.

The output 66 of inhibit gate 18 is shown connected as an input of the output OR gate 60. The three inputs of output OR gate 60, shown intermediate the output 92 of the AND gate 88 and the output 66 of the inhibit gate 18, are connected to the four remaining bit stores of FIG. 1: namely, stores 24, 28, 30, and 32.

Figure 3:
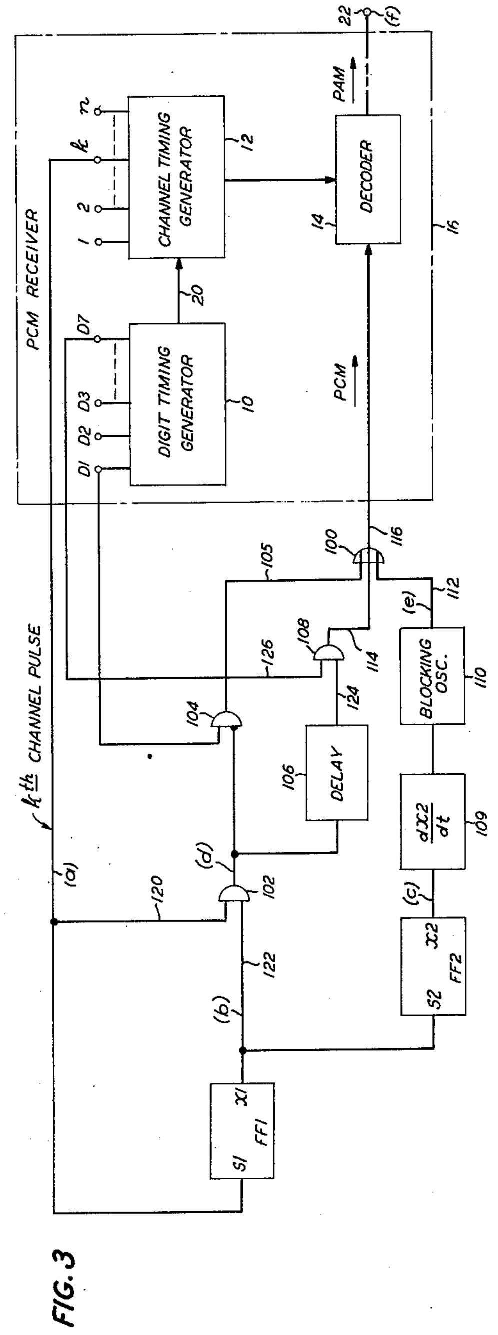
FIG. 3 shows a digital sine-wave generator, arranged in accordance with the invention and connected to test a PCM receiver, whose code generations, for simplicity and avoidance of quantizing error, are representative of only the maximum, minimum and zero values of the sine wave.

The circuit of FIG. 3 also produces a digital sine wave. The PCM receiver 16 is shown as before. Included therein are the decoder 14, the digit timing generator 10, and the channel timing generator 12.

The digital wave generator comprises a pair of bistable circuits, labeled FF1 and FF2. They may be conventional Eccles-Jordan circuits. As they go through equilibrium changes, their respective outputs $x1$ and $x2$ alternate between the binary states "1" and "0." Assuming, for example, that these outputs are both in the "0" state, application of a $k$th channel pulse to the input $s1$ of FF1 will cause the output $x1$ to revert to the binary "1" state. The output $x1$, in turn, will cause the state of the output $x2$ of FF2 to become "1" also. The bistable circuit FF2 is responsive only to binary "1" pulses supplied to its input $s2$ by the output $x1$ of FF1. Consequently, for every two equlibrium changes of FF1 there will be only one such change in FF2.

As can be seen, the digital generator consists of two principal networks or branches that interconnect the output $x1$ of FF1 and the output OR gate 100. Although OR gate 100 has three inputs 105, 114, and 112, the inputs 105 and 114 may be considered as terminations of the first interconnecting network.

The first network thus consists of the AND gate 102, the inhibit gate 104, the delay circuit 106 and the AND gate 108. The second network consists of the bistable circuit FF2, the differentiator circuit 109, and the blocking oscillator 110.

The AND gate 102 is enabled only upon the concurrence of a $k$th channel pulse and a binary "1" pulse at its inputs 120 and 122, respectively. The inhibit gate 104 passes D1 pulses from the digit timing generator 10 to the output OR gate 100 only when AND gate 102 is disabled, which it is at all times other than the $k$th channel periods and also during these periods, whenever the output $x1$ of FF1 is in the binary "0" state. When the gate 104 is thus uninhibited, the code group 1000000 appears at the input 105 of OR gate 100. We have seen that this code group represents zero values of the sine wave that is ultimately produced at the output 22 of the receiver 16. See waveform ($f$) of FIG. 4.

Figure 4:
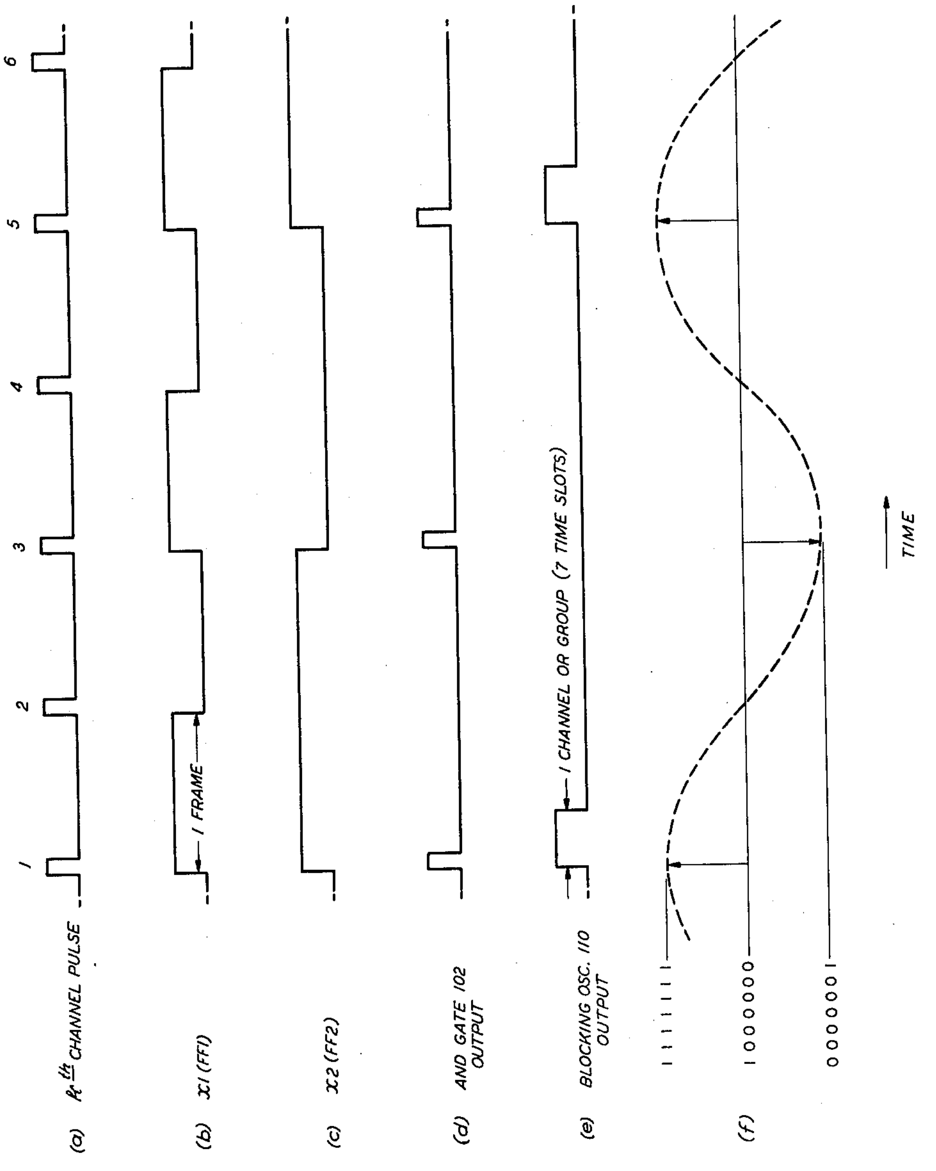
FIG. 4 is a plot of waveforms manifest at various specified points in the circuit of FIG. 3.

At this point it should be mentioned that the plots of FIG. 4 depict waveforms manifest at various indicated points in the circuit of FIG. 3. These points are labeled ($a$), ($b$), ($c$) . . . ($f$) in FIG. 3, and their representative waveforms are correspondingly labeled in FIG. 4.

The waveform ($a$) represents the train of $k$th channel pulses which is supplied to both the input $s1$ of bistable circuit FF1 and the input 120 of AND gate 102 of FIG. 3. The waveform ($b$) is present at the output terminal $x1$ of the bistable circuit FF1. Waveform ($c$) occurs at the output terminal $x2$ of the bistable circuit FF2. The output of AND gate 102 is represented by the waveform ($d$). The waveform ($e$) shows pulses which are generated at the output 112 of blocking oscillator 110 whenever the blocking oscillator is triggered by a binary "1" pulse from the output terminal $x2$ of the bistable circuit FF2. Finally, the waveform ($f$) consists of PAM samples of a pure sine wave, which is ideally produced at the output 22 of the receiver 16 in response to the code generations of the digital sine wave generator. As mentioned previously, deviations from this theoretical ideal are indicative of malfunctions occurring within the receiver 16. The waveforms of FIG. 4 will be helpful in understanding the operation of the circuit of FIG. 3.

As was assumed in the description of FIG. 1, it will be assumed in FIG. 3 that the decoder 14 operates in a system in which the code employed is such that the zero level is represented by the mid-range (1000000) of the code. Consequently, provisions similar to those made in the circuit of FIG. 1 are made in FIG. 3 to ensure that under ideal conditions, a symmetrical sine wave will be obtained. That is to say, as will be recalled, the minimum values of the sine wave will be represented by the code group 0000001. These minimum-valued code groups are supplied by way of the AND gate 108.

If we assume, as we did in connection with FIG. 1, that a code group of 0000000 will be interpreted by the decoder 14 as having a code value of −64 units, such code groups will have to be avoided. This function is accomplished by the inhibit gate 104, which supplies continuous trains of 1000000 groups that occupy all channels except the *k*th.

So long as AND gate 102 is enabled, the inhibit gate 104 will discontinue passage of D1 pulses to the output OR gate 100. Since AND gate 102 can be enabled only during predetermined *k*th channel periods, the zero-valued 1000000 code groups produced at the input 105 of OR gate 100 are discontinued only during these intervals. But whenever these code groups are discontinued, the AND gate 108 supplies the code groups 0000001 (representing, as we have seen, the minimum values of the sine wave) to the input 114 of OR gate 100.

The enablement of the input 124 of AND gate 108 by stimuli from AND gate 102 is delayed by a period such that these stimuli will coincide with the D7 pulses from generator 10. The delay circuit 106 provides the requisite delay. If the PCM system employs channel pulses that are coextensive with a channel period (which is usually not the case), then the coincidence of enabling stimuli from AND gate 102 and D7 pulses from generator 10 is assured and the delay circuit 106 may be discarded. But if the channel pulse widths are such that they encompass, say, only the first five time slots of a channel, then it can be seen that a delay period of at least two time slots will have to be provided by delay circuit 106 if an output stimulus of AND gate 102, which can be of no greater duration than the channel pulse supplied to its input 120, is to overlap the seventh time slot of the channel.

As we have seen, therefore, the first network is the avenue by which the minimum and zero code values of the sine wave are supplied to the output OR gate 100. During the period of each *k*th channel, one of these code values will be supplied to the OR gate 100. They will be supplied alternately. It will be recalled, however, that at all times other than the *k*th channel periods, the zero-valued 1000000 code groups are exclusively supplied to OR gate 100.

The maximum-valued 1111111 groups are supplied to the OR gate input 112 by the blocking oscillator 110. We shall see how these groups are generated. In the meantime, it should be noted that these groups, when generated, are superimposed by OR gate 100 upon simultaneously-generated, minimum-valued 0000001 groups, so that the resultant output of OR gate 100 is 1111111. A perusal of waveform (*f*) of FIG. 4 shows how the maximum, zero, and minimum code values are interspersed. The first *k*th channel pulse (see waveform (*a*) of FIG. 4) ultimately produces a maximum-valued 1111111 group at the output 116 of OR gate 100. Waveform (*a*) assumes that the first *k*th channel pulse caused the output $x1$ of FF1 to go into the binary "1" state and that the output $x1$, in turn, caused the output $x2$ of FF2 to change also to the "1" state. This maximum-valued group prevails over the simultaneously generated 0000001 group, supplied to the input 114 of OR gate 100. During the interim between the first and third *k*th channel pulses, which interim includes the second *k*th channel pulse, a succession of zero-valued 1000000 groups are supplied to the input 105 of OR gate 100 and emerge at its output 116. The third *k*th channel pulse results in the generation of a minimum-valued 0000001 group. A succession of zero-valued 1000000 groups follow. The fifth *k*th channel pulse begins the process anew.

It should be noted that the widths of the pulses plotted in the various waveforms of FIG. 4 are not drawn to scale. To avoid confusion, therefore, it is helpful to recall that, in the illustrative embodiments chosen to exemplify the invention, there are twenty-four channels per frame. Each of these channels encompasses one code group, i.e., seven time slots. Moreover, a channel pulse, as mentioned previously, does not ordinarily traverse an entire channel period. Thus, the widths of the *k*th channel pulses of waveform (*a*) and the blocking oscillator output pulses of waveform (*e*) are shown overproportionately large in relation to the widths of the pulses of waveforms (*b*) and (*c*), which appear at the outputs $x1$ and $x2$ of bistable circuits FF1 and FF2, respectively.

As mentioned previously, the second principal network, interconnecting the output $x1$ and FF1 and the input 112 of OR gate 100, consists of the bistable circuit FF2, the differentiator circuit 109, and the blocking oscillator 110. When a binary "1" pulse (see waveform (*c*) of FIG. 4) is conveyed from the output $x2$ of FF2 to the differentiator circuit 109, wherein the pulse is differentiated $$\left(\frac{dx2}{dt}\right)$$

a very sharp pulse is supplied to the blocking oscillator 110. The differentiation products of interest are those resulting from the differentiation of the leading edges of the pulses of waveform (*c*). These products are very sharp pulses. Fed into blocking oscillator 110, these sharply peaked pulses trigger the oscillator and causes it to discharge maximum-valued 1111111 groups (see waveform (*e*) of FIG. 4) into the input 112 of OR gate 116.

The maximum-valued code groups are thus provided by the blocking oscillator 110, while the zero and minimum-valued code groups are provided by the inhibit gate 104 and the AND gate 108, respectively. Ultimately, these code groups are converted by the decoder 14 into PAM samples which are then filtered (the filters of receiver 16 are not shown) so that they merge together as a sine wave at the receiver output 22. See waveform (*f*) of FIG. 4. Since only maximum, minimum and zero code values are supplied to the receiver 16 (compare the embodiment of FIG. 1), the sine-wave output of receiver 16 is free of quantizing distortion. Ideally, therefore, this sine wave should be pure and undistorted. If the output of the receiver 16 does not measure up to this theoretical ideal, the source of error can readily be located, for it is known that it must be within the receiver, not in the error-free digital wave generator. The contributions of the various elements of the receiver to noise and other forms of distortion can thus be determined. Moreover, the gains of the various active elements of the receiver can be adjusted and aligned as desired.

Although the invention has been described with reference to specific embodiments, this has been done merely to illustrate the invention and not to limit its spirit or scope.

What is claimed is:

1. A test circuit for testing the performance of a PCM receiver, which receiver includes a decoder and means for timing the occurrence of digits and channels, comprising means for storing separate and predetermined code groups representative of a specified cyclical wave; means interconnecting said storing means and said receiver timing means for timing the digit positions of said code groups; means interconnecting said storing means and said decoder for conveying each of said code groups to said decoder at appropriate times; and means, operative in response to said receiver timing means, for controlling the times at which each of said code groups is conveyed to said decoder.

2. A test circuit, as in claim 1, in which said storing means comprises a plurality of variable stores, each of which includes means for varying the code value of the code group which it stores.

3. A test circuit in accordance with claim 1 in which said storing means comprise means for producing binary code groups representative of a sine wave.

4. A test circuit for testing the performance of a PCM receiver, which receiver includes a decoder and digit and channel timing generators to time, respectively, the generation of digits and the commencement of each channel, each of said generators having a plurality of timing terminals corresponding in number respectively to the number of elements per group in the code employed and the number of channels per frame, comprising: a plurality of bit-storing devices, each having a trigger input and a timing input, each storing a group of code elements representative of the code value of a particular sample of a specified periodical wave, and each having an output through which its particular code group is discharged at predetermined times; a ring counter having a plurality of stages corresponding in number to the number of represented samples per cycle of said periodical wave, a trigger input connected to said stages to change their states sequentially, and an output at each of said stages for deriving stimuli therefrom; means connecting any one of said timing terminals of said channel timing generator, the $k$th channel terminal, to said trigger input of said counter to activate said first stage at the occurrence of each $k$th channel pulse; means connecting each of said digit timing terminals to each of the timing inputs of said storing devices to discharge each of said stored elements in an ordered array; means connecting each of said counter stage outputs to an associated trigger input of said bit-storing devices to commence the discharge of the code information stored in said associated device; and means to convey said discharged code information to said decoder.

5. A test circuit in accordance with claim 4 wherein said storing devices are variable stores, each of whose code elements may be re-arranged as desired, each comprising a plurality of code-element-productng AND gates, corresponding in number to the number of elements per code group, and each having a timing input, a reference input and an element-discharging output; means connecting each of said AND gate timing inputs to an associated one of the digit generator terminals recited in claim 4; a source of reference potential; adjustable switching means individually connecting each of said AND gate reference inputs to said reference source; the concurrence or nonconcurrence of reference potential and a digit timing pulse at the inputs of any of said AND gates causing the binary element "1" or "0," respectively, to be present at the AND gate output; a common AND gate having a pair of inputs and an output; the storing device trigger input, recited in claim 4, being one of said pair of inputs of said common AND gate; means connecting the other of said pair of inputs of said common AND gate to the outputs of each of said code-element-producing AND gates; and means connecting the output of said common AND gate to the means, recited in claim 4, for conveying the code information stored in each of said devices to said decoder.

6. A test circuit in accordance with claim 4 and means interconnecting said channel and digit timing generators to render said channel timing generator responsive to said digit timing generator.

7. A test circuit in accordance with claim 4 in which said means to convey said discharged code information to said decoder comprises an OR gate having a plurality of inputs corresponding in number to the number of said bit-storing devices.

8. A test circuit in accordance with claim 4 in which each of said bit storing devices comprises means for producing binary code groups representative of a particular sample of a sine wave.

9. A digital sine wave generator for testing the performance of a PCM receiver, which receiver includes a decoder and means for timing the occurrence of digits and channels, comprising first and second bistable circuits, the state of equilibrium of the second being dependent on that of the first; means interconnecting said first bistable circuit and said receiver timing means to change the state of equilibrium of said first bistable circuit with each occurrence of a particular channel; a first network, interconnecting said first bistable circuit and said decoder, to produce and convey to said decoder at appropriate times, determined by the state of equilibrium of said first bistable circuit and by said receiver timing means, code representations of the zero and minimum values of said sine wave; and a second network, including said second bistable circuit and also interconnecting said first bistable circuit and said decoder, to produce and convey to said decoder at appropriate times, determined by the state of equilibrium of said second bistable circuit, the code representation of the maximum value of said sine wave.

10. A digital sine wave generator for testing the performance of a PCM receiver, which receiver includes a decoder and means for timing the occurrence of digits and channels, comprising first and second bistable circuits, the state of equilibrium of the second being dependent on that of the first; means interconnecting said first bistable circuit and said receiver timing means to change the state of equilibrium of said first bistable circuit with each occurrence of a particular channel; a first network, interconnecting said first bistable circuit and said decoder, to produce and convey to said decoder at appropriate times, determined by the state of equilibrium of said first bistable circuit and by said receiver timing means, code representations of the zero and minimum values of said sine wave; and a second network, including said second bistable circuit and also interconnecting said first bistable circuit and said decoder, to produce and convey to said decoder at appropriate times, determined by the state of equilibrium of said second bistable circuit, the code representation of the maximum value of said sine wave; said second network further including means, operative in response to said second bistable circuit, to produce said code representation of said maximum value only when said second bistable circuit is in a specified one of its two states of equilibrium; said first network including inhibit means, operative in response to said receiver timing means and said first bistable circuit, to inhibit the production of said zero code representation only upon the concurrence of said particular channel and a specified state of equilibrium of said first bistable circuit; said inhibit means permitting the production of said minimum code representation only upon such concurrence and permitting the production in said first network of said zero code representation at all other times; and means, superimposing said maximum code representation upon said minimum representation, to convey said maximum representation to said decoder whenever said maximum and minimum representations coincide in time.

11. A digital sine wave generator for testing the performance of a PCM receiver, which receiver includes a decoder and digit and channel timing generators to time, respectively, the generation of digits and the commencement of each channel, each of said generators having a plurality of timing terminals corresponding in number, respectively, to the number of elements per group in the code employed and the number of channels per frame, comprising: a first bistable circuit and second bistable circuit, each having an input and an output and each changing state upon the application of a prescribed pulse to its input; the output of said first bistable circuit being connected to the input of said second bistable circuit; means connecting any one of said timing terminals of said channel timing generator, the *k*th channel terminal, to the input of said first bistable circuit to change the state thereof at the occurrence of each *k*th channel pulse; an AND gate having a pair of inputs and an output, one of its inputs being connected to the output of said first bistable circuit, the other AND gate input being connected to said *k*th channel terminal of said channel timing generator; an inhibit gate having an inhibit input, a normal input, and an output; said inhibit input being connected to said output of said AND gate and said normal input being connected to that terminal of said digit timing generator which controls the commencement of the first element of each code group; an output OR gate having a plurality of inputs, one of which is connected to said output of said inhibit gate; a blocking oscillator having an input and an output; means connecting said blocking oscillator input to said output of said second bistable circuit; said blocking oscillator producing at its output, when said second bistable circuit is in a particular one of its states of equilibrium, a pulse having a width equal to the duration of one channel; means connecting said blocking oscillator output to another of said plurality of OR gate inputs; and means connecting said OR gate output to said decoder.

12. A digital sine wave generator, as in claim 11, in which said means connecting said blocking oscillator input to said output of said second bistable circuit comprises a differentiator for mathematically differentiating the output waveform of said second bistable circuit.

13. A digital sine wave generator, as in claim 11, which further comprises means to render said sine wave symmetrical about the mid-level of said code, said last named means interconnecting said output of said AND gate and still another of said plurality of OR gate inputs.

References Cited in the file of this patent

UNITED STATES PATENTS

| | | |
|---|---|---|
| 1,961,367 | Kuhn | June 5, 1934 |
| 2,796,602 | Hess | June 18, 1957 |
| 2,946,044 | Bolgiano et al. | July 19, 1960 |
| 2,961,492 | Carbrey | Nov. 22, 1960 |